United States Patent [19]

Heijola et al.

[11] 4,369,853
[45] Jan. 25, 1983

[54] AIR-CUSHION VEHICLE

[75] Inventors: Pentti Heijola, Espoo; Fredrik Burmeister, Helsinki, both of Finland

[73] Assignee: Oy Wartsila Ab, Helsinki, Finland

[21] Appl. No.: 213,833

[22] Filed: Dec. 8, 1980

[30] Foreign Application Priority Data

Dec. 14, 1979 [FI] Finland ................................ 793935

[51] Int. Cl.³ .............................................. B60V 1/14
[52] U.S. Cl. ................................ 180/117; 114/67 A; 114/151
[58] Field of Search ............... 180/117, 120, 121, 122, 180/116; 114/67 A, 151, 144 B; 440/79, 80

[56] References Cited

U.S. PATENT DOCUMENTS

| 3,265,142 | 8/1966 | Winter | 180/117 |
| 4,046,215 | 9/1977 | Hietanen | 180/117 X |
| 4,237,992 | 12/1980 | Bristow | 180/116 |

Primary Examiner—John A. Pekar
Attorney, Agent, or Firm—McAulay, Fields, Fisher, Goldstein & Nissen

[57] ABSTRACT

The invention relates to an air-cushion vehicle comprising a hull, two air propulsion units located at a considerable distance from each other and one or several drive engines for the propulsion units. One of the propulsion units is located at the front end of the vehicle at one side of its longitudinal axis. The other unit is located at the rear end of the vehicle at the opposite side of said axis.

7 Claims, 4 Drawing Figures

AIR-CUSHION VEHICLE

BACKGROUND OF THE INVENTION

The present invention relates to an air-cushion vehicle comprising a hull, two air propulsion units located at a considerable distance from each other and one or several drive engines for said propulsion units.

Previously known air-cushion vehicles comprise a hull and one or several propulsion units. These units are located either close to the longitudinal axis of the vehicle or symmetrically at both sides thereof in the front or the rear of the vehicle. Turning of the vehicle is obtained, for example, by means of one or several side rudders as shown in U.S. Pat. No. 4,046,215. When the propulsion units are located symmetrically at both sides of the longitudinal axis of the vehicle, steering can also be carried out by varying the output power of one or several of the propulsion units.

Because of the location of their propulsion units, prior art air-cushion vehicles generally have relatively poor steering characteristics as well as inefficient cargo space. The steering response of the vehicle at low speeds is usually poor, when the propulsion units are located close to the longitudinal axis of the vehicle. At high speeds the response is better, but there is then considerable sideway sliding in curves. If the propulsion units are located symmetrically on both sides of the longitudinal axis in the front as well as in the rear of the vehicle, a good steering response can be obtained also at low speed. However, then at least four propulsion units are needed. This is expensive, and furthermore, the load capacity and the free deck area of the vehicle are considerably reduced.

OBJECTS AND SUMMARY OF THE INVENTION

The main object of the invention is to improve the manoeuvrability of air cushion vehicle by using only two propulsion units; an equally important object of the invention is to provide a vehicle of this type which has a higher cargo capacity and a larger free deck and/or cargo hold space than those of the prior art.

The invention is characterized in that one propulsion unit is located in the front end of the vehicle on one side of its longitudinal axis and the other unit is located in the rear end of the vehicle on the opposite side of said axis.

An air-cushion vehicle according to the invention has the following advantages: Firstly, the steering response of the vehicle is improved and turning on the spot is possible, since the moment arms of the forces generated by the propulsion units are the longest possible relative to the center of gravity of the vehicle. Various known air rudder means or turnable propulsion units can be used for turning. If the propulsion units are not turnably mounted, the steering action can be obtained by changing the revolution direction of one propeller, by varying the speed and/or the blade angle of the propellers, or by varying the power output of the propulsion units. Secondly, the effective free deck and cargo hold space of the vehicle is increased as well as the size of such load units which can be carried by the vehicle. A fast loading and unloading can easily be carried out at both ends of the vehicle.

By using rotatable propulsion units the steering response will be further improved. Thereby, improved vehicle manoevrability is obtained also in other directions than the main moving direction. By arranging the propulsion units close to the side of a mainly rectangular hull, the length of the moment arms mentioned earlier will be the greatest possible. A rectangular hull form is ideal for load carrying purposes. By locating the drive engines of the propulsion units so that the longitudinal axis of the engine is in a transverse position with respect to the longitudinal axis of the vehicle, the free deck and cargo hold space will be the most spacious.

BRIEF DESCRIPTION OF THE DRAWINGS

The various aspects of the invention are described by way of example with reference to the accompanying drawing, in which.

DETAILED DESCRIPTION OF THE BEST MODE

Figure 1:
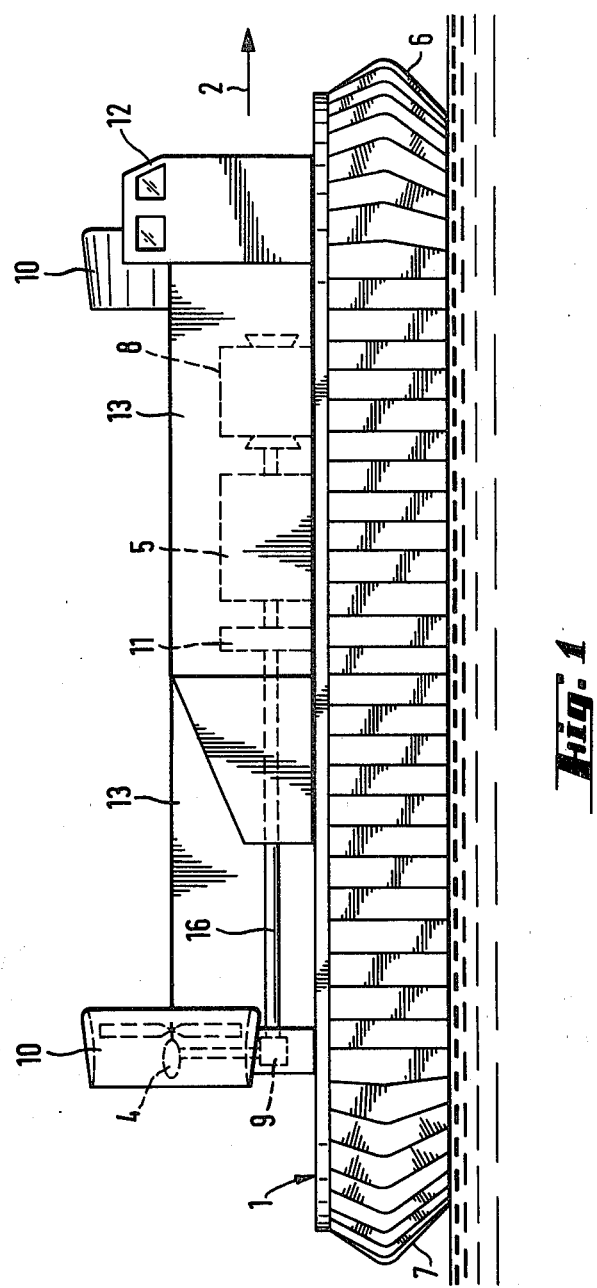
FIG. 1 shows a side view of an air-cushion vehicle according to the invention.
Figure 2:
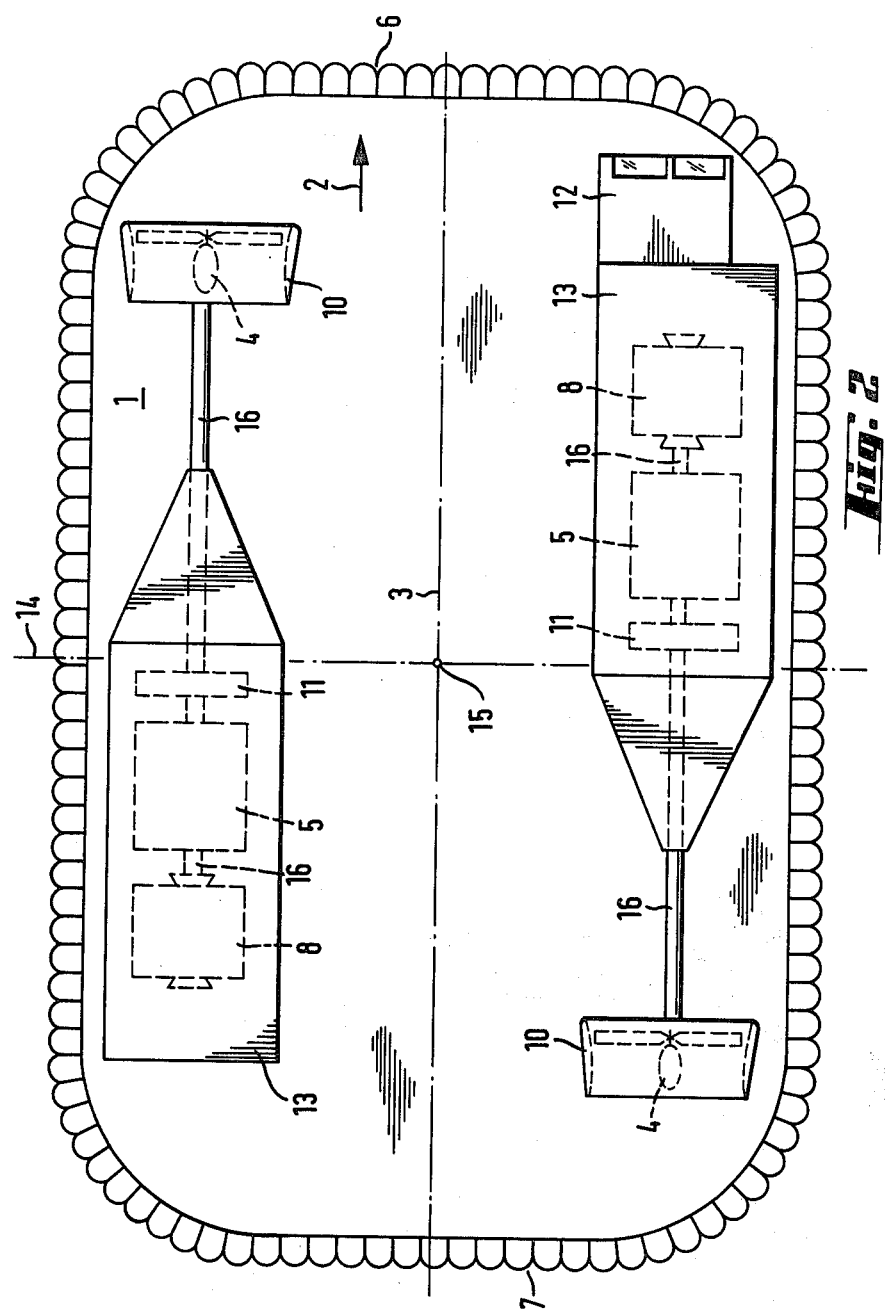
FIG. 2 shows a top view of the vehicle of FIG. 1.
Figure 4:
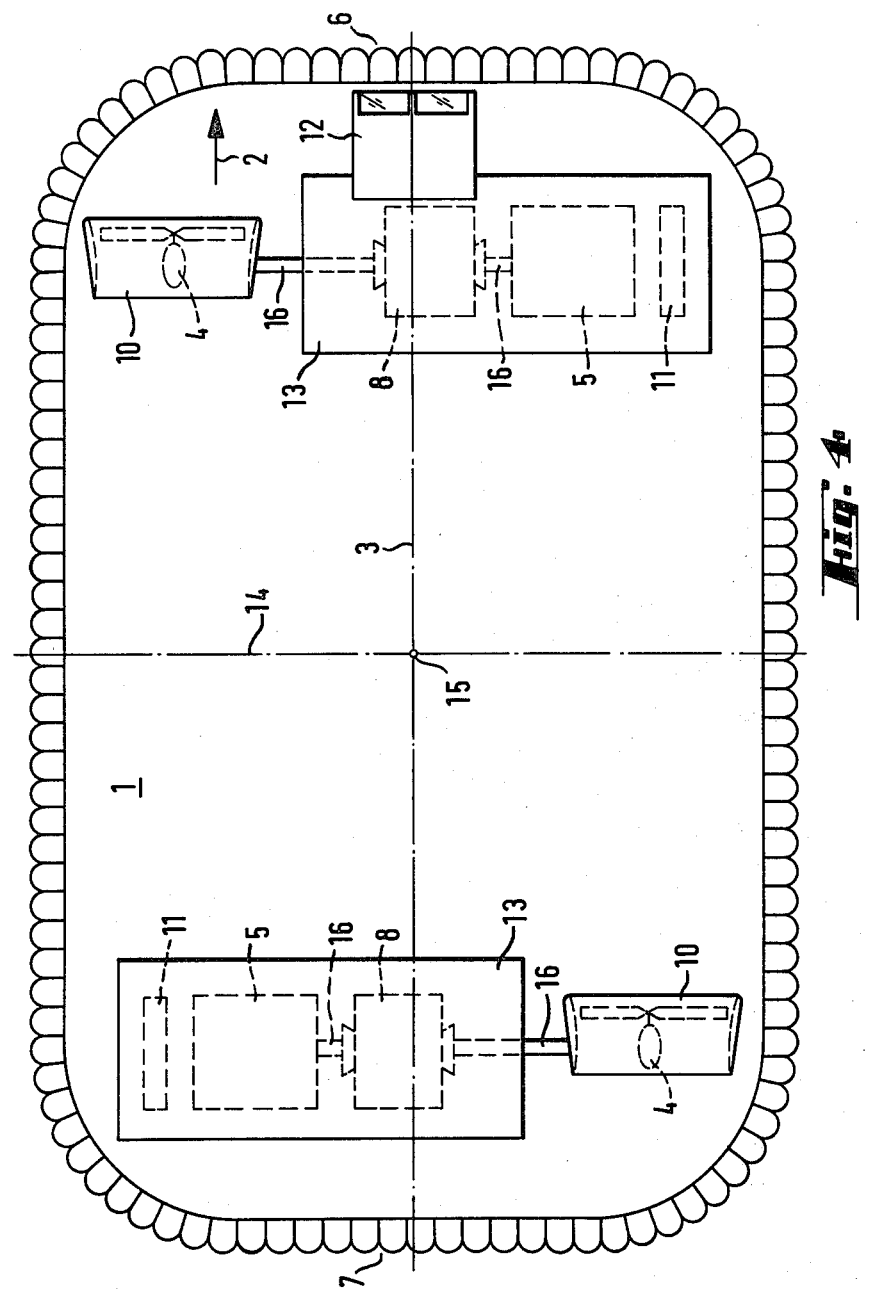
FIG. 4 shows a top view of the vehicle of FIG. 3.

In the embodiments shown, the two propulsion units 4 are located, one in the front 6 and the other in the rear 7 of the vehicle 1, at different sides of and at a considerable distance from the longitudinal axis 3 of the vehicle. This distance is at least equal to the outer lateral dimension of the unit or greater. The drive engines of the propulsion units are indicated by reference character 5 and the main direction of movement of the vehicle by reference character 2. Fan units 8 connected to drive engines 5 produce the pressure needed in the air-cushion enclosed by a flexible skirt under the vehicle 1. There is a protecting casing 13 enclosing drive engine 5, fan 8, an engine cooler 11 and the necessary regulating means and auxiliary devices not shown. The main shaft 16 of drive engines 5 is through a drive and steering power transmission gear 9 connected to drive unit 4 comprising a propeller and a shroud tunnel 10. A captains bridge construction 12 can be arranged at the front 6 of the vehicle, as shown. In FIGS. 2 and 4 the transverse axis 14 of the vehicle and its center of gravity 15 also are shown.

Figure 3:
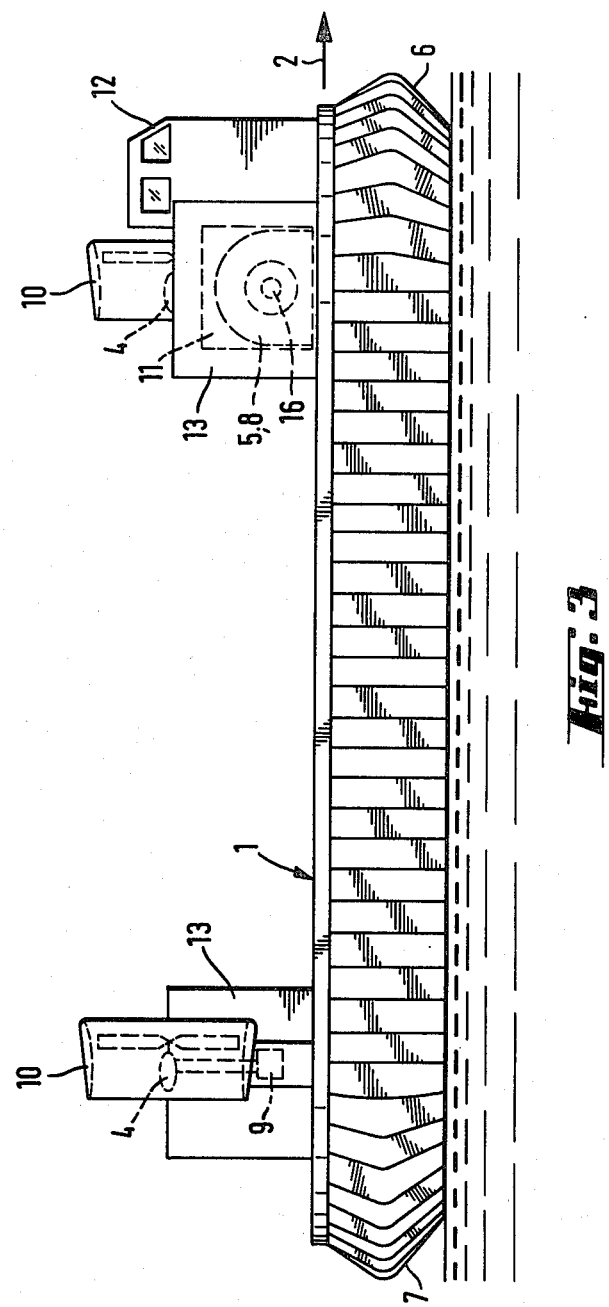
FIG. 3 shows a side view of another embodiment of an air-cushion vehicle according to the invention.

In the embodiments according to FIGS. 3 and 4, main shaft 16 of drive engines 5 is in a transverse position relative to longitudinal axis 3 of the vehicle. This arrangement gives an advantageously formed cargo space on or below deck. It also gives the advantage, that the heavy mass of the drive engines is located close to the longitudinal axis of the vehicle.

The invention is not limited to the embodiments shown, but several modifications thereof are feasible within the scope of the appended claims. For instance, instead of the propellers and the shroud tunnels shown, jet engines can be used.

We claim:

1. An air-cushion vehicle comprising a hull, two air propulsion units located at a considerable distance from each other and one or several drive engines for said propulsion units, one of said propulsion units being located at the front end of said vehicle at one side of its longitudinal axis, the other of said propulsion units being located at the rear end of said vehicle at the opposite side of said axis.

2. A vehicle according to claim 1, in which said propulsion units are rotatably mounted.

3. A vehicle according to claim 1 or 2, in which said propulsion units are located close to the outer side of the hull of said vehicle, said hull having a basically rectangular form.

4. A vehicle according to claim 1 or 2, in which said two air propulsion units are located at a considerable distance from said longitudinal axis.

5. A vehicle according to claim 1 or 2, in which said drive engines of the two air propulsion units each have their longitudinal axis in a transverse direction relative to the longitudinal axis of said vehicle.

6. A vehicle according to claim 4, wherein the distance between said unit and said axis is at least approximately equal to the outer lateral dimension of said propulsion unit.

7. The vehicle according to claim 6, wherein the distance between said unit and said axis is greater than the outer lateral dimension of said propulsion unit.

* * * * *